United States Patent
Chang

(10) Patent No.: US 6,240,837 B1
(45) Date of Patent: Jun. 5, 2001

(54) ELECTROTHERMAL COOKER

(75) Inventor: Li-Chen Chang, Taoyuan Hsien (TW)

(73) Assignee: Lyu Jan Co., Ltd., Taoyuan Hsien (TW)

( * ) Notice: Subject to any disclaimer, the term of this patent is extended or adjusted under 35 U.S.C. 154(b) by 0 days.

(21) Appl. No.: 09/615,356

(22) Filed: Jul. 13, 2000

(51) Int. Cl.[7] .............................. A47J 37/00; A47J 37/12
(52) U.S. Cl. .................... 99/411; 99/403; 99/413
(58) Field of Search ................ 99/339, 340, 403–418, 99/448, 449, 444–446, 400, 401; 126/381, 369; 219/429, 436, 438, 439, 441

(56) References Cited

U.S. PATENT DOCUMENTS

| | | | |
|---|---|---|---|
| 2,219,949 | * 10/1940 | Childs | 99/403 X |
| 2,597,695 | * 5/1952 | Braski et al. | 99/411 X |
| 2,753,436 | * 7/1956 | Schwaneke | 99/403 X |
| 3,433,150 | * 3/1969 | Fries | 99/403 |
| 3,463,077 | * 8/1969 | Lescure | 99/403 |
| 3,577,908 | * 5/1971 | Burg | 99/333 |
| 3,746,837 | * 7/1973 | Frey et al. | 210/387 X |
| 3,801,331 | * 4/1974 | Saho et al. | 99/403 X |
| 4,011,431 | * 3/1977 | Levin | 99/340 X |
| 4,138,606 | * 2/1979 | Brown | 219/442 X |
| 4,148,250 | * 4/1979 | Miki et al. | 99/403 X |
| 4,189,993 | * 2/1980 | Kaufman | 99/403 |
| 4,487,117 | * 12/1984 | Colley et al. | 99/403 X |
| 4,995,312 | 2/1991 | Leiros . | |

* cited by examiner

Primary Examiner—Timothy F. Simone

(57) ABSTRACT

An electrothermal cooker comprises a casing, a cover, an inner pot, a heating device, and a pot base, and is characterized in: a plurality of heat insulators and a supporting device are disposed between the casing and the inner pot, and between the inner pot and the pot base respectively for efficient heat insulation, stable support, and cost reduction.

7 Claims, 3 Drawing Sheets

ELECTROTHERMAL COOKER

BACKGROUND OF THE INVENTION

1. Field of the invention

This invention relates generally to electrothermal utensils, more particularly, it relates to an electrothermal cooker having a plurality of improved thermal insulator located between a casing and an inner pot, and a plurality of improved supporting means arranged between the inner pot and a pot base with better heat insulation and support effect.

2. Description of the prior art

A conventional electrothermal cooker, as disclosed in U.S. Pat. No. 4,995,312, mainly comprises a metallic pot and a heat-generating resistor, wherein the resistor is used to heat the pot up to 150° C. or more; as the pot is enclosed by a generic plastic casing that cannot stand temperature higher than 150° C., hence, an air layer is formed in the circular wall and the pot base of the pot for segregation of the plastic casing; the metallic pot is isolated by the air layer except that it is connected with a thermo-insulating ring, which also contacts the upper rim of the casing.

However, as the thermo-insulating ring is made of high-priced polyurethane or polyester, the competitive capability of the foregoing electrothermal cooker is inevitably weakened. In view of the defect, this invention is to provide an improved low-cost thermo-insulating structure with excellent efficacy for the electrothermal cooker.

SUMMARY OF THE INVENTION

The primary object of this invention is to provide an electrothermal cooker having a plurality of insulators disposed between a casing and an inner pot for achieving heat insulation efficiently and reducing cost.

Another object of this invention is to provide an electrothermal cooker having a plurality of supporting means disposed between an inner pot and a pot base for holding the inner pot stably.

In order to realize above said objects, this invention comprises a casing, a cover, an inner pot, a heating means, and a pot base, and is characterized in: a plurality of heat insulators and supporting means disposed between the casing and the inner pot, and between the pot base and the inner pot respectively.

For more detailed information regarding this invention together with further advantages or features thereof, at least an example of preferred embodiment will be elucidated below with reference to the annexed drawings.

BRIEF DESCRIPTION OF THE DRAWINGS

The related drawings in connection with the detailed description of this invention, which is to be made later, are described briefly as follows, in which.

DETAILED DESCRIPTION OF THE PREFERRED EMBODIMENT

Figure 1:
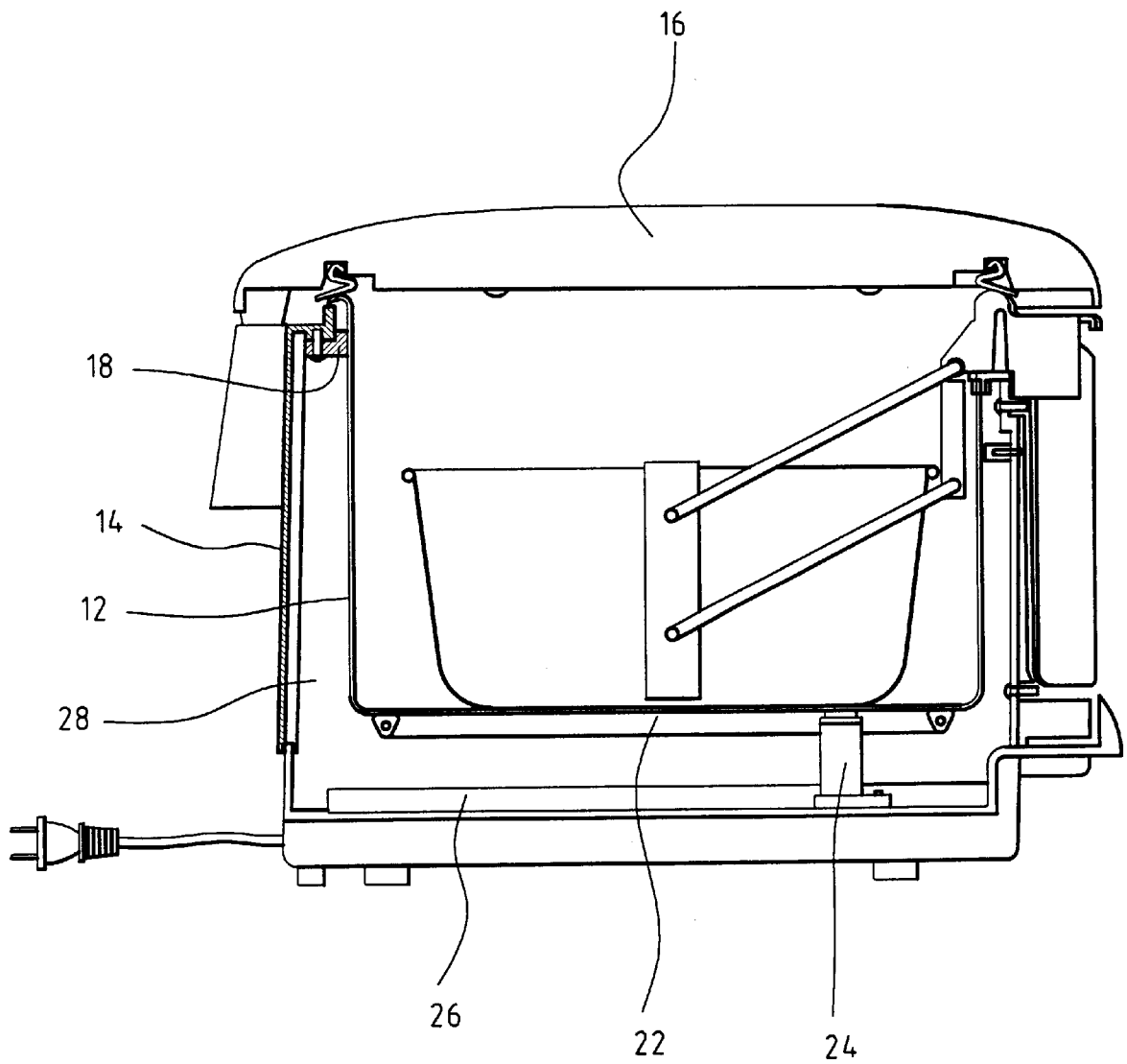
FIG. 1 is a lateral view of a preferred embodiment of this invention.

In a preferred embodiment shown in FIG. 1, an electrothermal cooker of this invention comprises a metallic inner pot 12, a casing 14, a cover 16, a heating means 22, and a pot base 26, and is characterized in: a plurality of heat insulators 18 disposed between the inner pot 12 and the casing 14; and, a plurality of supporting means 24 disposed between the pot base 26 and the inner pot 12 so as to obtain insulation and support effect.

When the electrothermal cooker is used for frying foods, oil loaded in the metallic inner pot 12 will be heated to a temperature unbearable to the plastics-made casing 14, therefore, the heat insulators 18 are arranged between the upper rim of both the casing 14 and the inner pot 12 for heat insulation. In addition, for enhancing insulation effect, an air layer 28 is reserved in the lateral wall and bottom face of the inner pot 12 to avoid direct contact of the casing 14 to the inner pot 12. Moreover, the supporting means 24 utilized for supporting the inner pot 12 is made of a heat-insulating material.

Figure 2:
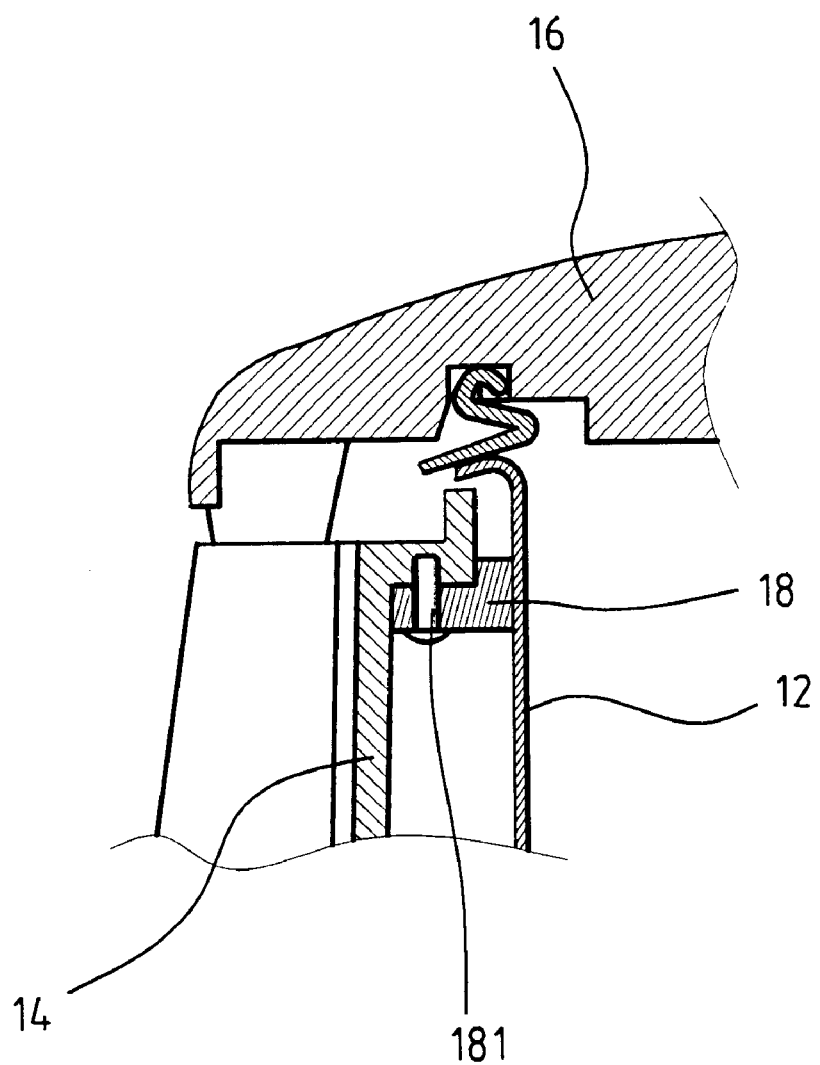
FIG. 2 is a partially lateral view (1) of the preferred embodiment of this invention.

As illustrated in FIG. 2, three pieces of the heat insulator 18 arranged between the casing 14 and the inner pot 12 are made of a heat-endurable material, such as polyurethane or polyester, and equally spaced in a contained angle of 120 degrees in a plane defined by the casing 14 and the inner pot 12 and fixed by bolts 181.

Figure 3:
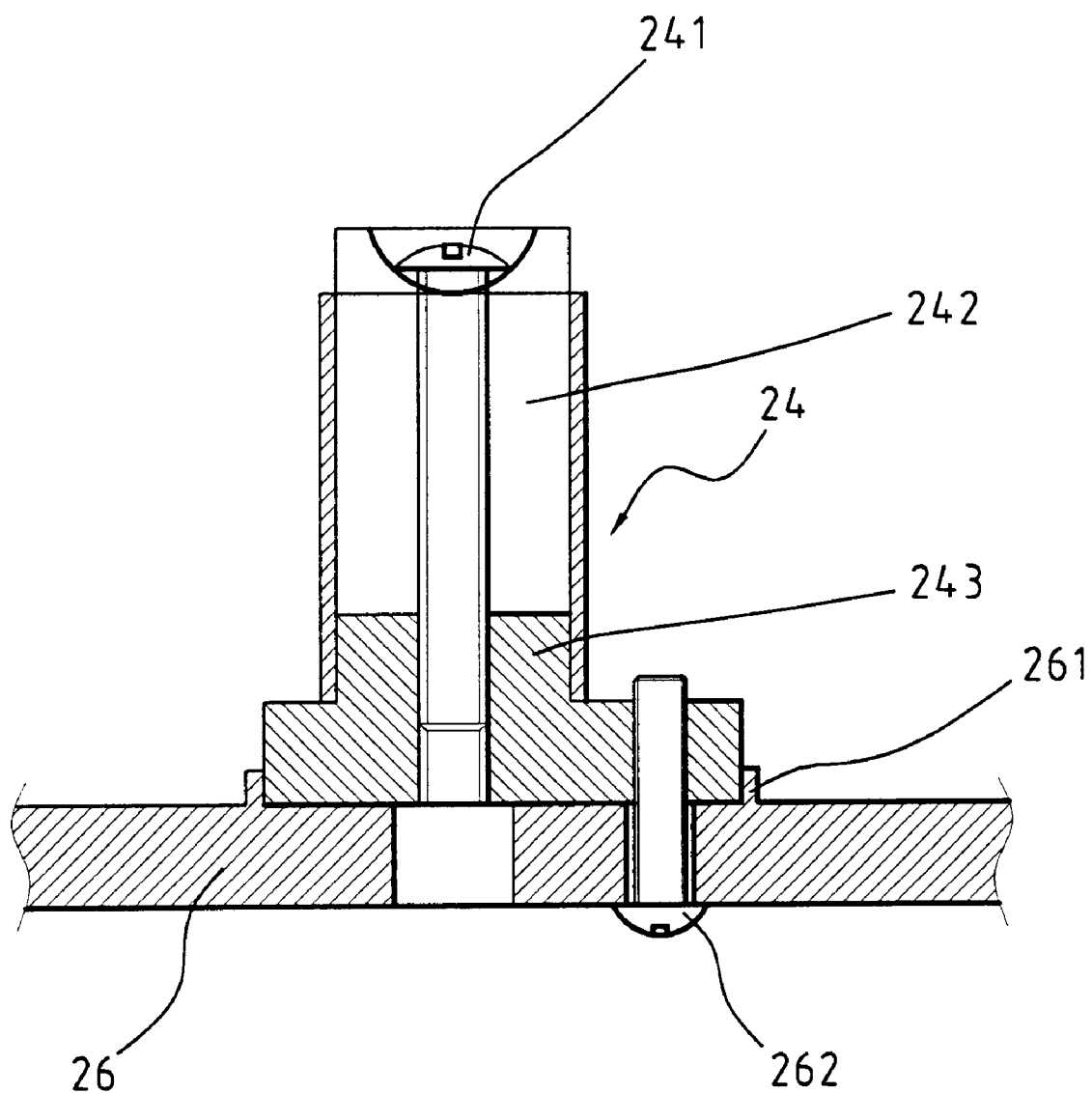
FIG. 3 is a partially lateral view (2) of the preferred embodiment of this invention.

Moreover, three units of the supporting means 24 are equally distributed between the inner pot 12 and the pot base 26 in a contained angle of 120 degrees, and staggeringly positioned relative to the heat insulators 18, wherein each of the supporting means 24 comprises an insulation portion 242 and a root portion 243 (shown in FIG. 3), wherein the insulation portion 242 located on top of the root portion 243 is the portion that contacts the inner pot 12, and the root portion 243 is located between two protruding pieces 261 of the pot base 26 and retained to the pot base 26 by a bolt 262; and, a bolt stud 241 is used to fix the inner pot 12 on the supporting means 24.

In this invention, a triple-point support of the heat insulator 18 is adopted to obtain equilibrium and save material in comparison with an annular disposition in the conventional electrothermal cooker mentioned above.

Although, this invention has been described in terms of preferred embodiments, it is apparent that numerous variations and modifications may be made without departing from the true spirit and scope thereof, as set forth in the following claims.

What is claimed is:

1. An electrothermal cooker, comprising: a casing, a cover, an inner pot, a heating means, and a pot base, characterized in: a plurality of heat insulators and supporting means disposed between the casing and the inner pot, and between the pot base and the inner pot respectively.

2. The electrothermal cooker according to claim 1, wherein three pieces of the heat insulator are disposed between the casing and the inner pot and distributed equally in a contained angle of 120 degrees.

3. The electrothermal cooker according to claim 1, wherein three units of the supporting means are disposed between the inner pot and the pot base and distributed equally in a contained angle of 120 degrees.

4. The electrothermal cooker according to claim 1, wherein the heat insulators and the supporting means are positioned staggeringly.

5. The electrothermal cooker according to claim 2, wherein the heat insulators and the supporting means are positioned staggeringly.

6. The electrothermal cooker according to claim 3, wherein the heat insulators and the supporting means are positioned staggeringly.

7. The electrothermal cooker according to claim 1, wherein the heat insulator is made of polyurethane or polyester.

* * * * *